United States Patent
Taniguchi et al.

(10) Patent No.: US 7,650,987 B2
(45) Date of Patent: Jan. 26, 2010

(54) BELT CONNECTING METHOD, PRESETTER, AND BELT CONNECTING APPARATUS

(75) Inventors: Yasuaki Taniguchi, Yamatokohriyama (JP); Yoshirou Tamaki, Yamatokohriyama (JP); Takeshi Kubota, Yamatokohriyama (JP)

(73) Assignee: Nitta Corporation, Osaka (JP)

( * ) Notice: Subject to any disclaimer, the term of this patent is extended or adjusted under 35 U.S.C. 154(b) by 98 days.

(21) Appl. No.: 11/660,435

(22) PCT Filed: Aug. 25, 2005

(86) PCT No.: PCT/JP2005/015441
§ 371 (c)(1),
(2), (4) Date: Dec. 27, 2007

(87) PCT Pub. No.: WO2006/022332
PCT Pub. Date: Mar. 2, 2006

(65) Prior Publication Data
US 2008/0190745 A1    Aug. 14, 2008

(30) Foreign Application Priority Data
Aug. 26, 2004  (JP) .............................. 2004-246222
Sep. 7, 2004   (JP) .............................. 2004-259604

(51) Int. Cl.
*B29C 65/78* (2006.01)
(52) U.S. Cl. ..................................... 198/844.2; 474/254
(58) Field of Classification Search .............. 198/844.2; 474/254; 24/31 R
See application file for complete search history.

(56) References Cited

U.S. PATENT DOCUMENTS

| | | | | | |
|---|---|---|---|---|---|
| 4,427,107 | A | * | 1/1984 | Roberts et al. | 198/844.2 |
| 5,670,230 | A | * | 9/1997 | Schlueter, Jr. et al. | 428/57 |
| 5,951,441 | A | * | 9/1999 | Dalebout et al. | 482/54 |
| 5,979,639 | A | * | 11/1999 | Sytema | 198/731 |
| 7,222,729 | B1 | * | 5/2007 | Travis | 198/844.2 |
| 7,467,709 | B2 | * | 12/2008 | Whitlock et al. | 198/844.2 |

FOREIGN PATENT DOCUMENTS

| | | |
|---|---|---|
| JP | 4-305436 A | 10/1992 |
| JP | 5-26350 U | 4/1993 |
| JP | 5-90003 U | 12/1993 |
| JP | 2000-141491 A | 5/2000 |

OTHER PUBLICATIONS

Chinese Office Action dated Nov. 21, 2008.

* cited by examiner

*Primary Examiner*—Mark A Deuble
(74) *Attorney, Agent, or Firm*—Sughrue Mion, PLLC

(57) ABSTRACT

A method for enabling a presetter to connect connecting portions of belts having different widths, and for forming an endless connection of a flat belt with no defects such as the bend of the connecting portions. This method includes a first step of setting so that the connecting portions at both ends of the flat belt are placed on a lower mold surface of the presetter, and that, with the flat belt held from both sides by a wall part standing from the lower mold surface and a flat belt member having substantially the same compression property as the flat belt, an upper mold of the presetter is placed on the flat belt and the flat belt member, and then fixing the flat belt and the flat belt member by the presetter; and a second step of connecting the connecting portions at the both ends by pressing the presetter with the flat belt and the flat belt member fixed.

27 Claims, 12 Drawing Sheets

BELT CONNECTING METHOD, PRESETTER, AND BELT CONNECTING APPARATUS

This application is a 371 of PCT/JP2005/015441, filed Aug. 25, 2005, the disclosure of which is incorporated herein by reference.

BACKGROUND OF THE INVENTION

1. Field of the Invention

The present invention relates to a connecting method of a belt such as a flat belt and a toothed belt for transmission or transportation, and to a presetter and a belt connecting apparatus that are used in the connecting method.

2. Description of Related Art

Generally, the flat belt and the toothed belt for transmission or transportation are normally used with their both ends connected in an endless state. Examples of the shapes of connections of the flat belt are a skive (taper) shape, a step shape, and a finger shape. The shape of a connection of the toothed belt is a rectangular finger shape, and the like. To form a connection of any one of the shapes, connecting portions are temporarily laminated and then inserted into a cold platen press so as to be heated and pressurized. It is however necessary for an operator to be skilled in linearly laminating both ends of a belt with no bend.

For this reason, conventionally, there has been used a fitting jig called "presetter" as described in, for example, Japanese Unexamined Patent Publication No. H4-305436 (FIGS. 3, 4, 6 and 7). Unskilled one can easily form an endless connection of a belt by temporarily laminating both ends of the belt with a presetter, and setting the presetter into a cold platen press. Further, the use of the pressetter makes it easy to perform successive insertion into the cold platen press.

FIGS. 12A to 12C are schematic perspective views illustrating a conventional presetter as described in the above Publication No. 4-305436. That is, FIG. 12A is a schematic perspective view illustrating a presetter applied to a flat belt whose connecting portions at both ends are of a skive shape, or a step shape. FIG. 12B is a schematic perspective view illustrating a presetter applied to a flat belt whose connecting portions at both ends are of a finger shape. FIG. 12C is a schematic perspective view illustrating a presetter applied to a toothed belt whose connecting portions at both ends are of a rectangular finger shape.

Referring to FIG. 12A, a lower mold 51 of the presetter applied to a flat belt 53 of the skive shape or the step shape is profiled with a groove C in the shape of a concave which corresponds to the width of the flat belt 53 to be processed. It is constructed and arranged so that the connecting portions of the flat belt 53 are inserted into the groove C, and a cushion mat 54 or the like as an intermediate member for dispersing press pressure is placed thereon, and an upper mold (a keep plate) 52 is placed thereon, all of which are then pressed from above.

Referring to FIG. 12B, similarly, a lower mold 51 of the presetter applied to a flat belt 53 of the finger shape is profiled with a groove C in the shape of a concave which corresponds to the width of the flat belt 53 to be processed. It is constructed and arranged so that the connecting portions of the flat belt 53 are inserted into the groove C, and a resin sheet 58 and a cushion mat 54 or the like are placed on the connecting portions, and an upper mold (a keep plate) 52 is placed thereon, all of which are then pressed from above.

Referring to FIG. 12C, in the presetter applied to a toothed belt 63 of the finger shape, lower mold side members 61a and 61b, each provided with tooth space, are engaged with each other to a lower mold bottom plate 61 provided with tooth space, and a plurality of fixing screws 57 are used to fix a plurality of positions, thereby forming a groove C corresponding to the width of the toothed belt 63. It is constructed and arranged so that the rectangular finger connecting portions of the toothed belt 63 are inserted into the groove C, and the upper surface of the connecting portions are covered with a resin sheet 58, and a cushion mat 54 or the like is placed thereon, and further an upper mold (a keep plate) 52 is placed thereon, all of which are then pressed from above.

Nevertheless, in the above-mentioned arrangements of the conventional presetters, the groove C in the shape of a concave, into which the connecting portions are inserted, has a constant width, whereas the flat belt and the toothed belt whose connecting portions are connected to each other have different widths. It is therefore necessary to prepare a presetter per width of a belt processed. There is also a problem that successive insertions of the connecting portions having the same width into the cold platen press requires a large number of presetters having the same width.

SUMMARY OF THE INVENTION

An object of the present invention is to provide a belt connecting method that enables a presetter to connect connecting portions of belts having different widths, with no defect such as the bend of the connecting portions, and provide a presetter and a belt connecting apparatus.

To solve the above-mentioned problems, the present invention provides the following belt connecting methods, presetters, and belt connecting apparatuses.

(1) A flat belt connecting method for forming an endless connection of a flat belt by using a presetter, including the step in which connecting portions at both ends of the flat belt are placed on a surface of a lower mold of the presetter, and, with the flat belt held from both sides by a wall part standing from the surface of the lower mold and a flat belt member having substantially equivalent compression property as the flat belt, an upper mold of the presetter is placed on the flat belt and the flat belt member, and then the flat belt and the flat belt member are fixed by the presetter; and the step of connecting the connecting portions at the both ends by pressing the presetter.

(2) The flat belt connecting method as set forth in the above (1) wherein adhesive is applied to connecting surfaces in the connecting portions at the both ends of the flat belt.

(3) The flat belt connecting method as set forth in the above (1) wherein the step of fixing the connecting portions at the both ends of the flat belt and the flat belt member is carried out by placing the upper mold of the presetter, via an intermediate member, on the flat belt and the flat belt member.

(4) The flat belt connecting method as set forth in the above (3) wherein the intermediate member is a mesh mat or a cushion mat.

(5) The flat belt connecting method as set forth in the above (1), further including the step of, after connecting the connecting portions at the both ends of the flat belt, releasing the flat belt member from the connecting portions at the both ends.

(6) The flat belt connecting method as set forth in the above (1) wherein the flat belt is of a rubber type or a resin type.

(7) The flat belt connecting method as set forth in the above (1) wherein the connecting portions at the both ends of the flat belt are subjected to laminate connection or end-to-end connection.

(8) The flat belt connecting method as set forth in the above (1) wherein, with the flat belt held from both sides by the wall part and the flat belt member, the flat belt and the flat belt member are firmly fixed by fixing means.

(9) The flat belt connecting method as set forth in the above (1) wherein the upper mold of the presetter is placed after placing a resin sheet for melt bonding or the resin sheet and an intermediate member on the connecting portions at the both ends and surroundings thereof in the flat belt.

(10) The flat belt connecting method as set forth in the above (1) wherein the press is conducted by a cold platen press.

(11) A presetter for use in forming a connection of a flat belt, including a lower mold that is used to place connecting portions at both ends of a flat belt and a flat belt member having substantially equivalent compression property as the flat belt, a wall part that stands from one side of the lower mold and holds the connecting portions at the both ends of the flat belt from both sides, along with the flat belt member, an upper mold that is placed on the connecting portions at the both ends of the flat belt and the flat belt member, and fixing means for firmly fixing the connecting portions at the both ends of the flat belt and the flat belt member.

(12) The presetter as set forth in the above (11) wherein the fixing means is provided on each of both sides of the wall part.

(13) A belt connecting apparatus that forms an endless connection of a flat belt, including a presetter as set forth in the above (11) or (12), and press means that connects the connecting portions at the both ends by press working, with the flat belt and the flat belt member fixed to the presetter.

(14) The belt connecting apparatus as set forth in the above (13) wherein the press means is a cold platen press.

(15) A flat belt connecting method for forming an endless connection of a flat belt by using a presetter, including the step of placing connecting portions at both ends of the flat belt on a surface of a lower mold of the presetter; the step of holding the flat belt from both sides by a stationary wall part and a movable wall part that stand from the surface of the lower mold; the step of fixing the flat belt by placing an upper mold of the presetter whose width is adjusted so as to conform to a width of space in between the stationary wall part and the movable wall part, on an upper surface of the flat belt held between the stationary wall part and the movable wall part; and the step of connecting the connecting portions at the both ends by pressing the presetter with the flat belt fixed.

(16) The flat belt connecting method as set forth in the above (15) wherein adhesive is applied to connecting surfaces in the connecting portions at the both ends of the flat belt.

(17) The flat belt connecting method as set forth in the above (15) wherein the upper mold of the presetter whose width is adjusted is inserted after placing a resin sheet for melt bonding, or the resin sheet and an intermediate member on the connecting portions at the both ends and surroundings thereof in the flat belt.

(18) The flat belt connecting method as set forth in the above (15) wherein the connecting portions at the both ends of the flat belt are subjected to laminate connection or end-to-end connection.

(19) The flat belt connecting method as set forth in the above (15) wherein the upper mold of the presetter is formed at least by a pair of plate members whose tapered portions are disposed in slidable face-to-face relationship, and the pair of plate members are mutually slid to adjust a width of the upper mold.

(20) The flat belt connecting method as set forth in the above (15) wherein, after placing the intermediate member, the upper mold of the presetter whose width is adjusted is engaged in the connecting portions and surroundings thereof in the flat belt.

(21) The flat belt connecting method as set forth in the above (15) wherein the press is conducted by a cold platen press.

(22) A toothed belt connecting method for forming an endless connection of a toothed belt by using a presetter, including the step of placing connecting portions at both ends of the toothed belt on a surface of a lower mold of a presetter; the step of holding the toothed belt from both sides by a stationary wall part and a movable wall part that stand from the surface of the lower mold; the step of placing a resin sheet for melt bonding and an intermediate member on the connecting portions at the both ends and surroundings thereof in the toothed belt; the step of fixing the toothed belt and the resin sheet and the intermediate member by placing an upper mold of the presetter whose width is adjusted so as to conform to a width of space in between the stationary wall part and the movable wall part, on an upper surface of the intermediate member; and the step of connecting the connecting portions at the both ends by pressing the presetter with the toothed belt and the resin sheet and the intermediate member fixed.

(23) The toothed belt connecting method as set forth in the above (22) wherein the upper mold of the presetter is formed at least by a pair of plate members whose tapered portions are disposed in slidable face-to-face relationship, and the pair of plate members are mutually slid to adjust a width of the upper mold.

(24) A presetter for use in forming a connection of a belt, including: a lower mold having a flat surface part, a stationary wall part and a movable wall part that stand from the flat surface part and hold, from both sides, connecting portions at both ends of a belt; and an adjustable length upper mold that fixes the flat belt together with the upper mold by inserting at least a bottom surface part into space in between the stationary wall part and the movable wall part.

(25) The presetter as set forth in the above (24) wherein the upper mold is formed at least by a pair of plate members whose tapered portions are disposed in slidable face-to-face relationship so that their mutual slides permit adjustment of a width of the upper mold.

(26) A belt connecting apparatus that forms an endless connection of a belt, including a presetter as set forth in the above (24) or (25), and press means that connects the connecting portions at the both ends by press working, with the connecting portions of the belt fixed to the presetter.

(27) The belt connecting apparatus as set forth in the above (26) wherein the press means is a cold platen press.

Thus, the present invention eliminates the necessity for manufacturing a presetter per width of a belt, permitting a considerable reduction in manufacturing costs. Further, the present invention provides a belt free of defects such as the bend of connecting portions.

BRIEF DESCRIPTION OF THE DRAWINGS

FIGS. 1A and 1B are schematic perspective views illustrating a presetter according to a first preferred embodiment of the present invention;

FIGS. 8A-1 to 8B-3 are schematic views for explaining a method for setting divided upper molds;

DETAILED DESCRIPTION OF PREFERRED EMBODIMENTS

First Preferred Embodiment

Preferred embodiments of the present invention will be described below with reference to the accompanying drawings. FIGS. 1A and 1B are schematic perspective views illustrating a presetter with a flat belt and a flat belt member fixed thereto in a belt connecting apparatus according to a first preferred embodiment of the present invention. Specifically, FIG. 1A is a schematic perspective view illustrating a presetter applied to a flat belt whose material is of a rubber type. FIG. 1B is a schematic perspective view illustrating a presetter applied to a flat belt whose material is of a resin type. FIG. 2A is a plan view illustrating the presetter of the first preferred embodiment. FIG. 2B is its exploded perspective view.

Figure 1:
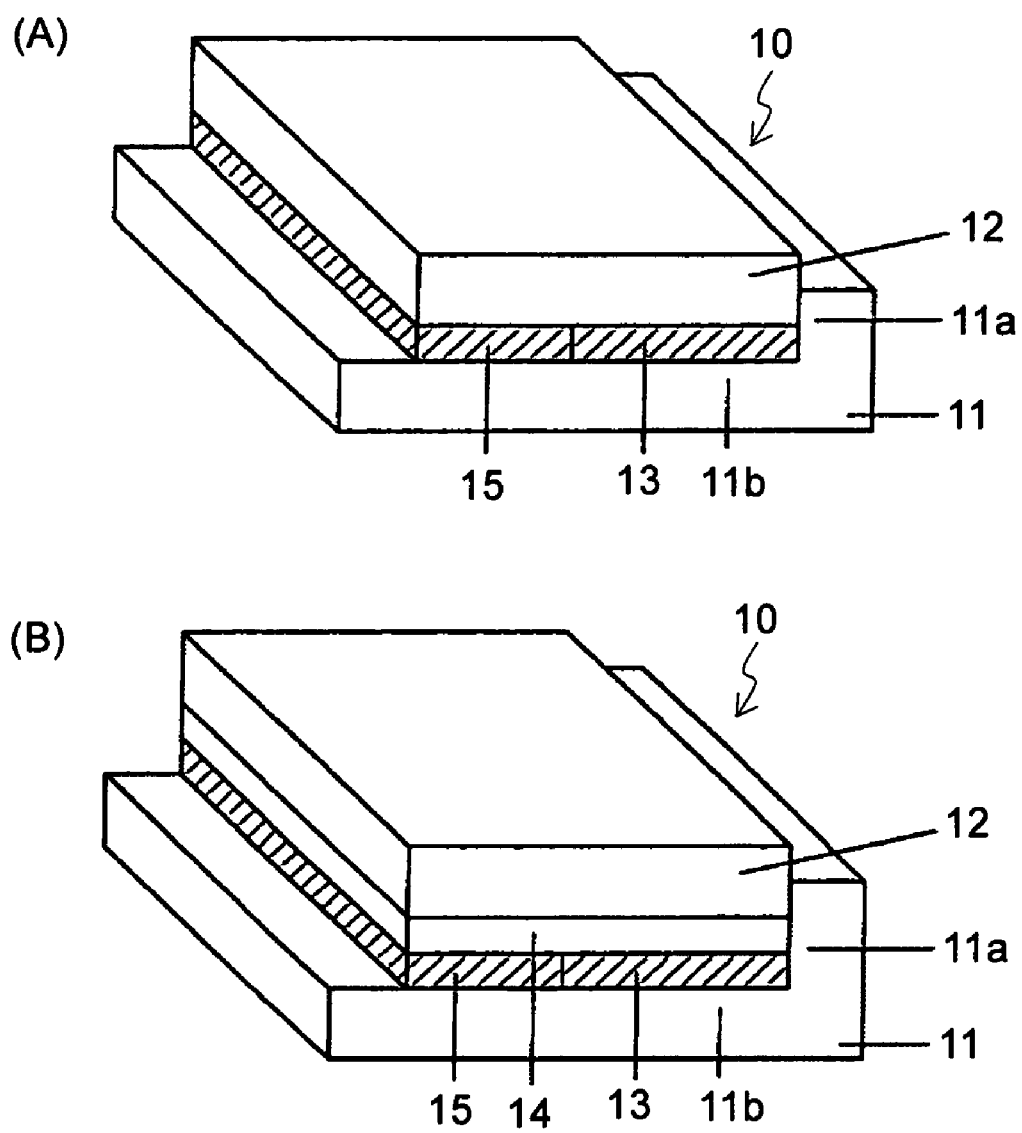
Figure 2:
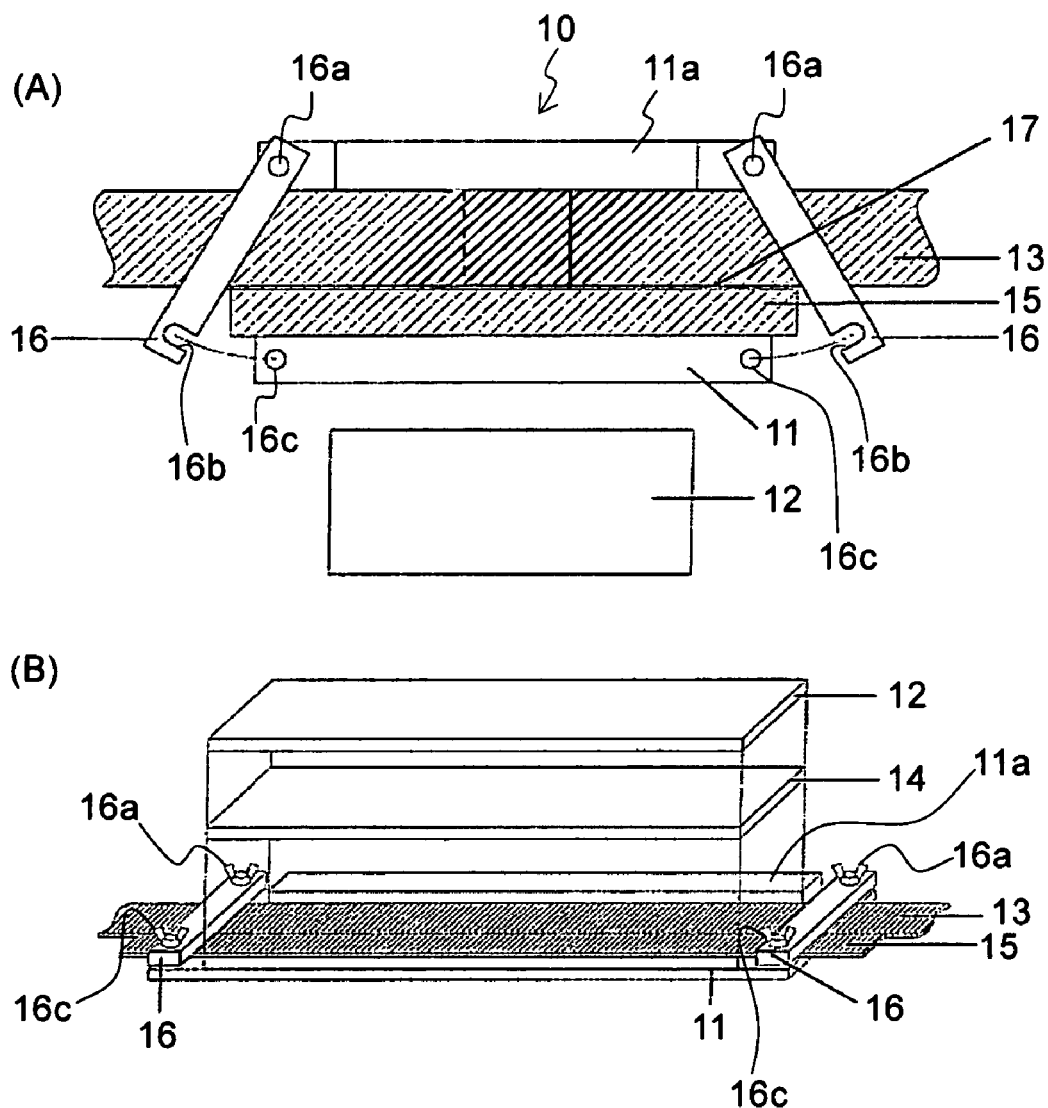
FIG. 2A is a plan view illustrating the presetter of the first preferred embodiment.
FIG. 2B is its exploded perspective view.

Referring to FIG. 1A to 2B, a presetter 10 has a lower mold 11 and an upper mold (a keep plate) 12. Connecting portions at both ends of a flat belt 13, and a flat belt member 15 having substantially the same compression property as the flat belt 13 are placed on the lower mold 11. In FIG. 1B and FIG. 2B, an intermediate member 14 is placed on the flat belt 13 and the flat belt member 15. As shown in FIGS. 2A and 2B, disposed at both ends of the lower mold 11 are brackets 16 (fixing means) for firmly fixing the connecting portions at both ends of the flat belt 13 and the flat belt member 15. In these drawings, only the connecting portions of the flat belt 13 are illustrated, with the rest of the flat belt 13 omitted.

As shown in FIGS. 1A and 1B, the lower mold 11 has a wall part 11a of L-like cross section that is disposed at one end in a lengthwise direction of the presetter 10, and a flat surface 11b in its horizontal direction. The connecting portions at the both ends of the flat belt 13 are set linearly on the flat surface 11b along the wall part 11a of the lower mold 11. Adhesive is applied to connecting surfaces at both ends of the flat belt 13, so that the connecting portions at the both ends are temporarily laminated. No particular limitations are imposed on the adhesive. Various types of known adhesive can be employed.

The flat belt member 15 contacts in parallel with the flat belt 13, and is then placed on the flat surface 11b. No particular limitations are imposed on the flat belt member 15, except that it should have the substantially the same compression property as the flat belt 13. Preferably, the material of the flat belt member 15 is the same as that of the flat belt 13. Preferably, the thickness of the flat belt member 15 is the same as that of the flat belt 13, and even a slightly lower one is also usable. The flat belt member 15 is required to have enough length and width as to be fixable by the brackets 16. That is, the flat belt member 15 is required to have such a structure as to permit a uniform pressure application onto the flat belt 13 and the flat belt member 15 when press working is carried out by a later-described cold platen press. The flat belt member 15 after press working is reusable depending on the state thereof.

In cases where the shape of the connection portions is a skive (taper) shape or a step shape (lamination connection type), when the material of the flat belt 13 is of a rubber type, an upper mold (a keep plate) 12 is directly set on the flat belt 13 and the flat belt member 15, as shown in FIG. 1A. In this setting operation, the upper mold (the keep plate) 12 is guided and set on the wall part 11a of L-like cross section of the lower mold 11.

Examples of materials of the above-mentioned rubber type are natural rubber, isoprene rubber, butadiene rubber, styrene-butadiene rubber, ethylene-propylene rubber, chloroprene rubber, chlorinated polyethylene, epichlorohydrine rubber, nitrile rubber, acryl rubber, urethane rubber, H—NBR (hydrogenation nitrile-butadiene rubber), and silicone rubber. These rubbers may be used singularly or in combination of two or more kinds.

When the material of the flat belt 13 is of a resin type, the intermediate member 14 is set on the flat belt 13 and the flat belt member 15, and an upper mold (a keep plate) 12 is set thereon, as shown in FIG. 1B.

Examples of materials of the resin type are thermoplastic resins such as polyurethane, polyvinyl chloride, polycarbonate, polyester, polyallylate, styrene-butadiene copolymer, styrene-acrylonitrile copolymer, acryl copolymer, styrene-acrylic acid copolymer, polyethylene, ethylene-vinyl acetate copolymer, chlorinated polyethylene, polypropylene, vinyl chloride-vinyl acetate copolymer, alkyd resin, polyamide, polysulfone, diallyl phthalate resin, ketone resin, fluororesin, polyvinyl acetal, and polyether; and thermoplastic elastomers such as polyester elastomer, polyamide elastomer, and polyolefin elastomer. These resins may be used singularly or in combination of two or more kinds.

As the intermediate member 14, for example, a cushion mat having a function of dispersing press pressure, a silicone mat for improving mold releasing property, or a mesh mat for providing irregularities (凹凸) on the surface of a belt can be employed according to the purpose. The above-mentioned intermediate member 14 may be used singularly. Alternatively, for example, the cushion mat and the silicone mat may be used together. The setting of the intermediate member 14 may be omitted as necessary.

Both ends of the flat belt 13 and the flat belt member 15 are further fixed by brackets 16 disposed at both ends in the lengthwise direction of the presetter 10. Specifically, as shown in FIGS. 2A and 2B, each of the brackets 16 is constructed and arranged so that one end side thereof is rotatably fixed on the wall part 11a by a wing screw 16a, and a notch part 16b formed on the other end side is removably fixed by a wing screw 16c disposed at a side opposite the wall part 11a on the flat surface 11b. By virtue of this construction of the brackets 16, the both ends of the flat belt 13 and the flat belt member 15 can be fixed to the presetter 10.

With the above-mentioned construction, the connecting portions at the both ends of the flat belt 13 are fixed to the presetter 10, and then subjected to press working with a cold platen press, so that the presetter 10 can connect the connecting portions irrespective of the width of the flat belt 13. Here, the cold platen press is a machine capable of performing press working at a predetermined pressure while heating or cooling at a predetermined temperature. The present invention can employ any type of known machines having this function.

Figure 3:
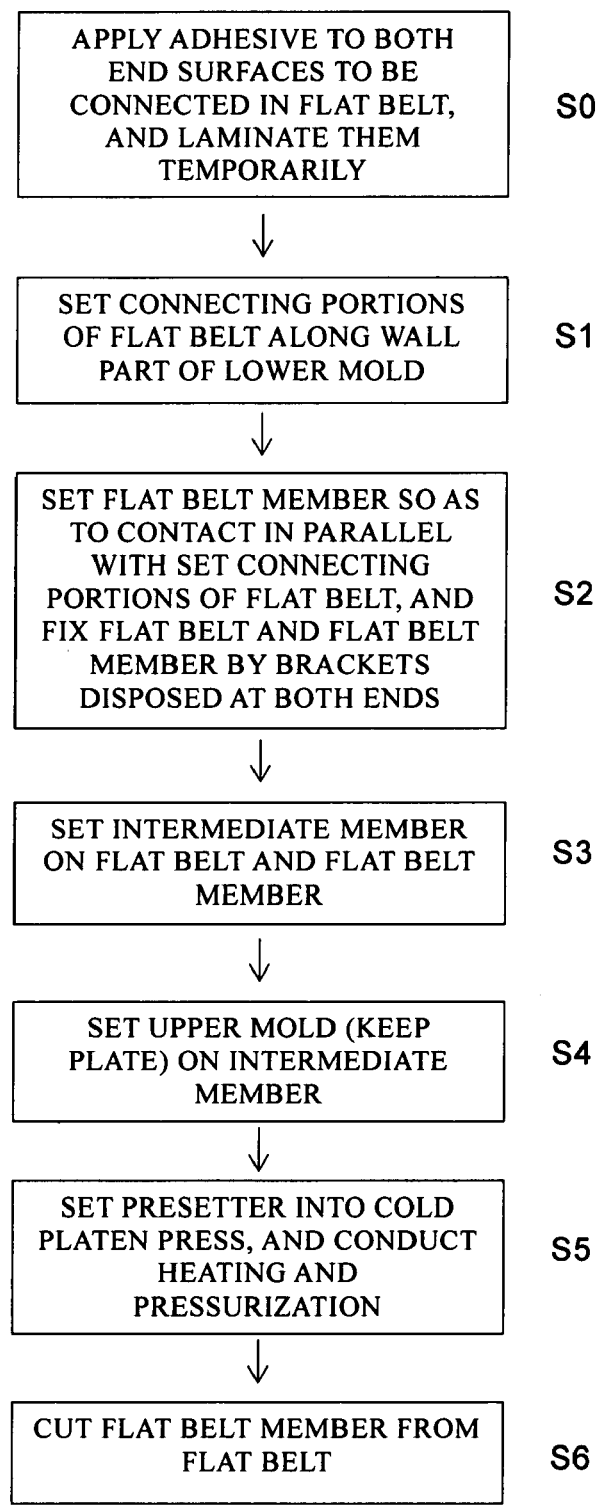
FIG. 3 is a flowchart for explaining a flat belt connecting method according to the first preferred embodiment.

The operation process of a belt connecting method in the first preferred embodiment will be described below with reference to FIG. 3. FIG. 3 is a flow chart illustrating the operation process.

First, adhesive is applied in advance to both end surfaces to be connected in the flat belt 13, and both end surfaces of the flat belt 13 are temporarily laminated (step S0). Then, the connecting portions of the flat belt 13 are set on the flat surface 11b, along the wall part 11a of the lower mold 11 of the presetter 10 (step S1). The temporal lamination in step S0 may be carried out at this stage.

The flat belt member 15 is set on the flat surface 11b so as to contact in parallel with the connecting portions of the flat belt 13 set in step S1, and both ends of the flat belt 13 and the flat belt member 15 are fixed by the brackets 16 disposed at both ends in the lengthwise direction of the presetter 10 (step S2).

An intermediate member 14 is set on the flat belt 13 and the flat belt member 15 set in steps S1 and S2, respectively (step S3). When the flat belt 13 is of a rubber type, the process of step S3 can be omitted.

An upper mold (a keep plate) 12 is set on the flat belt 13 and the flat belt member 15, or on the intermediate member 14 set on the flat belt 13 and the flat belt member 15 (step S4).

The presetter 10 with the connecting portions of the flat belt 13 set by the steps S1 to S4, is set into the cold platen press, and then subjected to a predetermined temperature and a predetermined pressure for a predetermined time, thereby connecting the connecting portions (step S5). At this time, the pressure property of the flat belt 13 is substantially the same as that of the flat belt member 15, and hence a uniform pressure can be applied to the connecting portions of the flat belt 13. In addition, the flat belt member 15 avoids that the adhesive applied to the connecting end surfaces of the flat belt 13 extrudes in a widthwise direction of the flat belt 13 due to the pressure applied during the press working.

Thereafter, the flat belt member 15 is cut along a perforation 17 as shown in FIG. 2A, from the connecting portions of the flat belt 13 removed from the cold platen press (step S6). This results in an endless flat belt. In accordance with the first preferred embodiment, there is no need to prepare a number of presetters according to the type of the width of a flat belt. That is, a presetter is applicable to flat belts having different widths. In addition, because the flat belt 13 and the flat belt member 15 have substantially the same pressure property, a uniform pressure can be applied thereto to equalize the strengths of the connecting portions.

Second Preferred Embodiment

Figure 4:
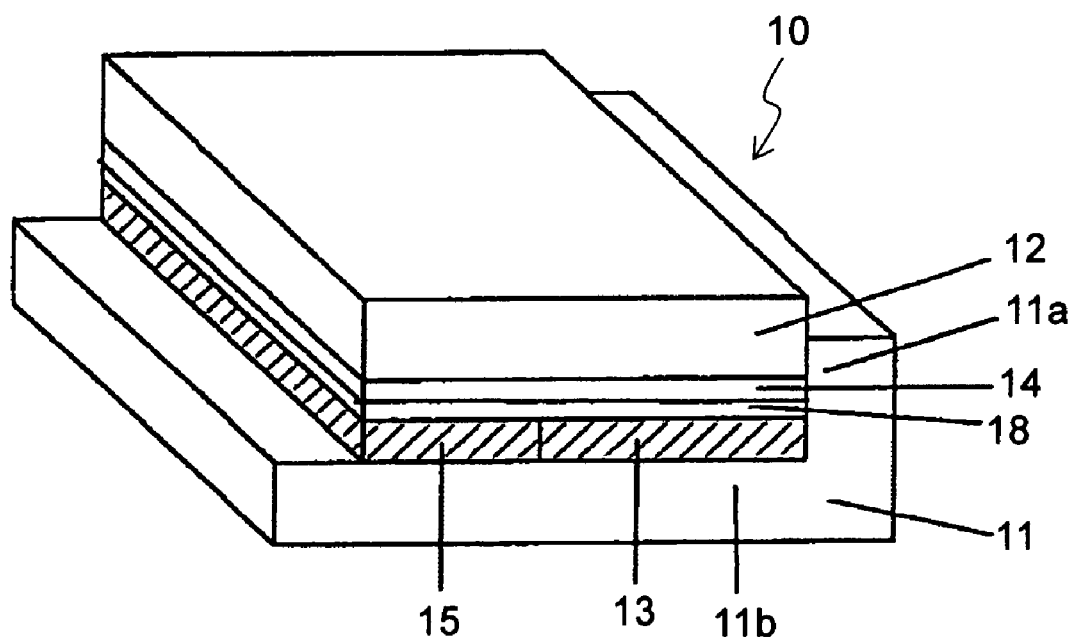
FIG. 4 is a schematic perspective view illustrating a presetter according to a second preferred embodiment of the present invention.

A second preferred embodiment of the present invention will next be described in detail with reference to the accompanying drawings. FIG. 4 is a schematic perspective view illustrating a presetter according to the second preferred embodiment. The second preferred embodiment differs from the first preferred embodiment in that a resin sheet 18 is further placed.

Specifically, the second preferred embodiment is intended for application to a case where the connecting portions of the flat belt 13 are subjected to end-to-end connection (i.e., an end-to-end connection type), as in the case with the finger shape. It is constructed and arranged so that both end surfaces to be connected in the flat belt 13 are shaped like a comb tooth, and the resin sheet 18 is set on the connecting portions and surroundings thereof in the flat belt 13, and an intermediate member 14 (e.g., a mesh mat, a cushion mat) and an upper mold (a keep plate) 12 are set on the resin sheet 18.

The resin sheet 18 is one that is heated and melted to connect the connecting portions. As the material of the resin sheet 18, there are, for example, the thermoplastic resins and the thermoplastic elastomers as exemplified above as the material of the resin type of the flat belt. The setting of the resin sheet 18 may be omitted as necessary.

Otherwise, the construction is identical with that of the first preferred embodiment. Therefore, the same reference numerals have been used as in FIGS. 1A to 2B, with the corresponding description omitted.

Figure 5:
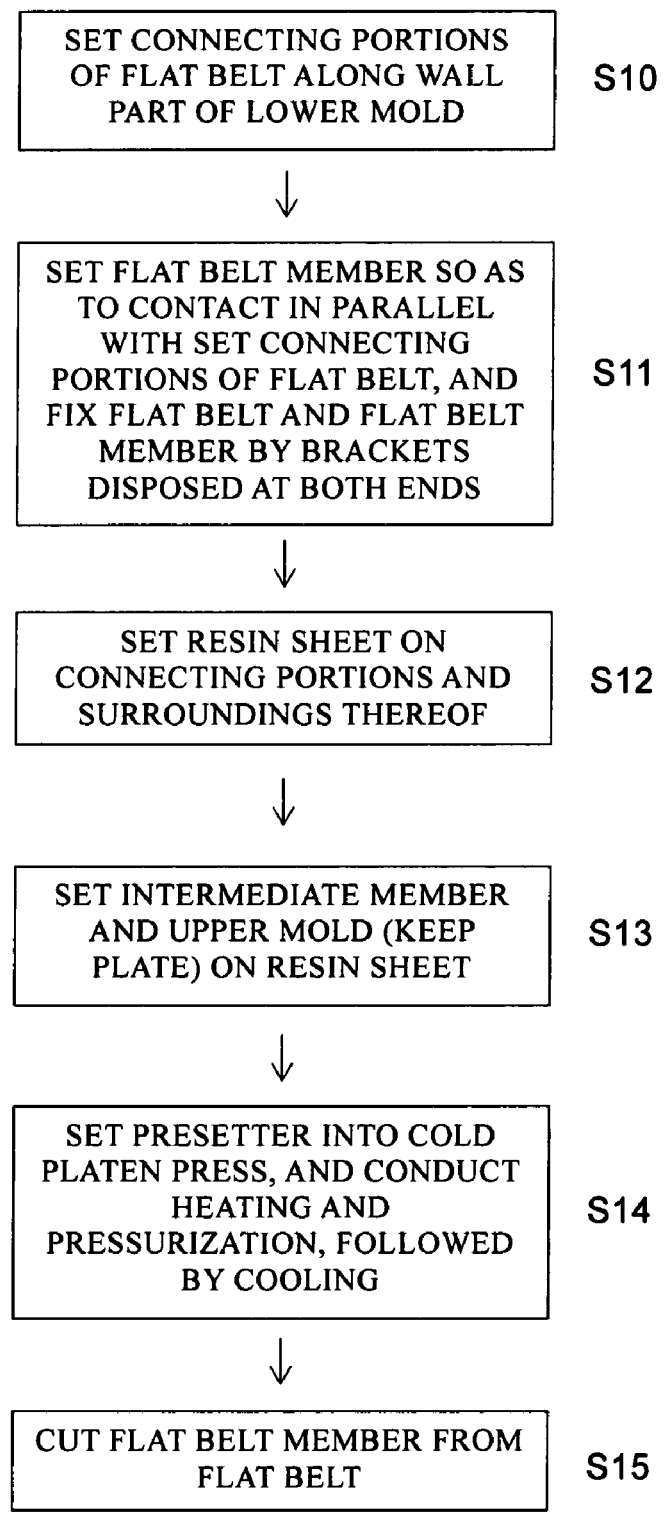
FIG. 5 is a flowchart for explaining a flat belt connecting method according to the second preferred embodiment.

The operation process of a belt connecting method in the second preferred embodiment will next be described with reference to FIG. 5. FIG. 5 is a flow chart illustrating the operation process.

First, the connecting portions of a flat belt 13 are set on a flat surface 11b, along a wall part 11a of a lower mold 11 of a presetter 10 (step S10). The comb tooth shapes of both end surfaces to be connected in the flat belt 13 are positioned and set so as to oppose to and contact with each other, and then fixed temporarily. A flat belt member 15 is set on the flat surface 11b so as to contact in parallel with the connecting portions of the flat belt 13 set in step S10. The flat belt 13 and the flat belt member 15 are then fixed by brackets 16 disposed at both ends in the lengthwise direction of the presetter 10 (step S11).

Next, a resin sheet 18 is set on the connecting portions and surroundings thereof in the flat belt 13 set in step S10 (step S12). An intermediate member 14 and an upper mold (a keep plate) 12 are set on the flat belt 13 and the flat belt member 15 and the resin sheet 18 (step S13).

The presetter 10 with the connecting portions of the flat belt 13 set by the steps S10 to S13, is set into a cold platen press, and then subjected to a predetermined temperature and a predetermined pressure for a predetermined time, so that the resin sheet 18 is heated and melted to connect the connecting portions. At this time, the pressure property of the flat belt 13 is substantially the same as that of the flat belt member 15, allowing a uniform pressure to be applied. In addition, the flat belt member 15 avoids that the melted resin sheet 18 extrudes in a widthwise direction of the flat belt 13 due to the pressure applied during the press working.

Thereafter, this is then cooled for a predetermined time within the cold platen press (step S14). This cooling is continued until the melted resin sheet 18 is solidified, namely until the connecting portions are completely connected. Thereafter, the flat belt member 15 is cut along the perforation 17 as shown in FIG. 2A, from the connecting portions of the flat belt 13 removed from the cold platen press (step S15). This results in an endless flat belt. Thus, the above-mentioned construction is also capable of obtaining the same effect as in the first preferred embodiment.

Third to Fifth Preferred Embodiments

Figure 6:
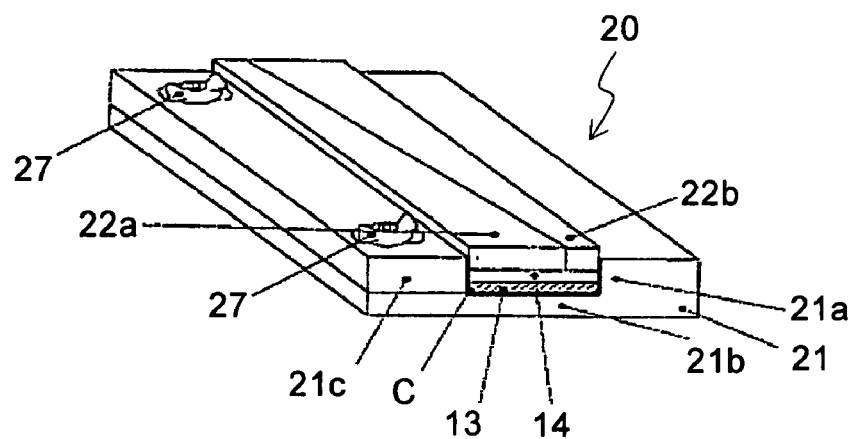
FIGS. 6A, 6B, and 6C are schematic perspective views illustrating presetters according to third, fourth, and fifth preferred embodiments of the present invention, respectively.
Figure 6:
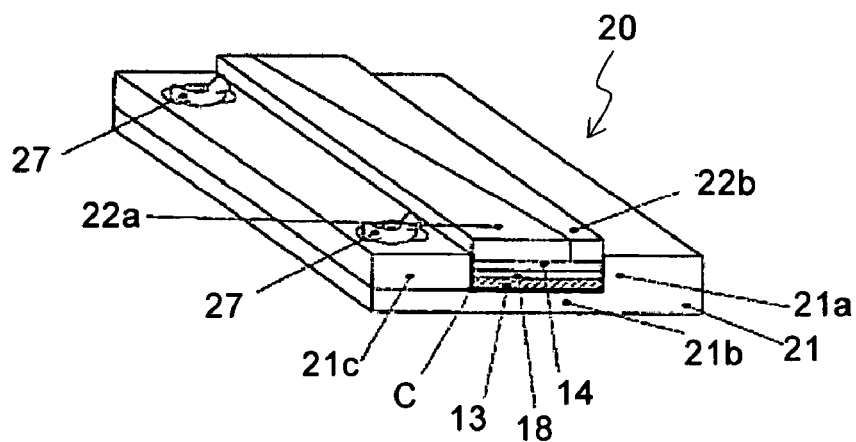
Figure 6:
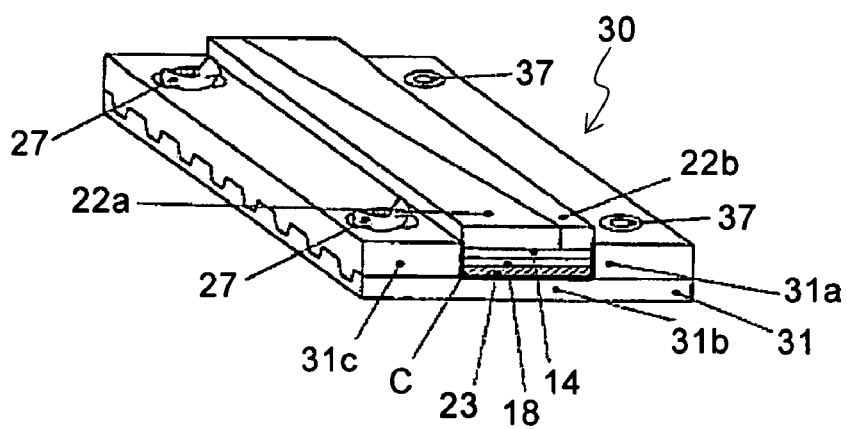
Figure 7:
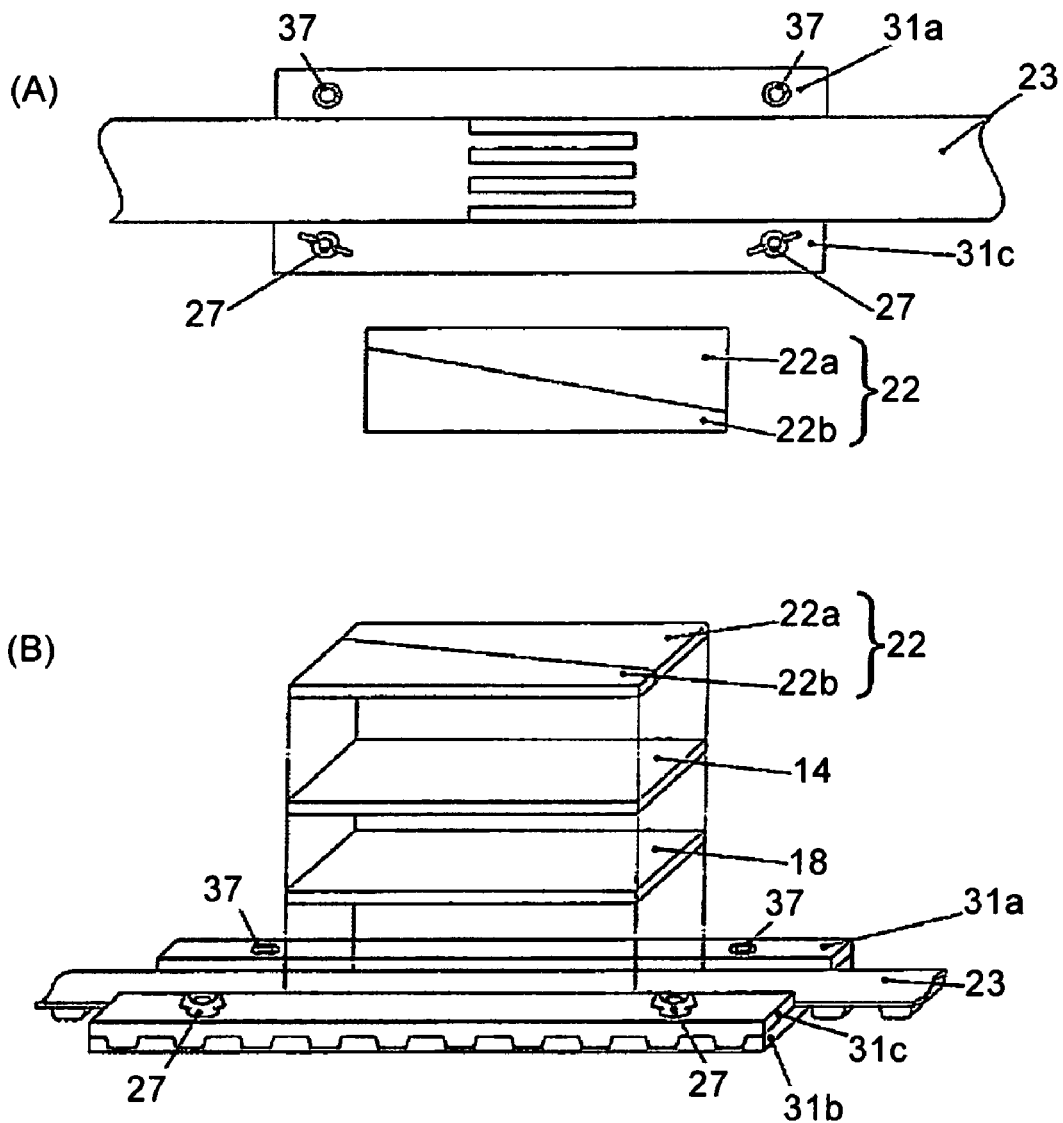
FIG. 7A is a plan view of FIG. 6C.
FIG. 7B is an exploded perspective view of FIG. 6C.

Third to fifth preferred embodiments of the present invention will be described below in detail with reference to the accompanying drawings. FIGS. 6A to 6C are schematic perspective views illustrating presetters according to the third to fifth preferred embodiments, respectively. Specifically, FIG. 6A is a schematic perspective view illustrating a presetter applied to a flat belt of the laminate connection type according to the third preferred embodiment. FIG. 6B is a schematic perspective view illustrating a presetter applied to a flat belt of the end-to-end connection type according to the fourth preferred embodiment. FIG. 6C is a schematic perspective view illustrating a presetter applied to a toothed belt of the end-to-end connection type according to the fifth preferred embodiment. FIG. 7A is a plan view of FIG. 6C. FIG. 7B is an exploded perspective view of FIG. 6C. In FIGS. 6A to 7B, the same reference numerals have been used for the same or like parts as in FIGS. 1A to 2B, and FIG. 4, and the corresponding descriptions are omitted here. The third to fifth preferred embodiments have many common points, and hence the constructions of these embodiments will be described collectively.

Each of belt connecting apparatuses of the third to fifth preferred embodiments consists of a presetter 20 (30), and a cold platen press (not shown). As shown in FIGS. 6A and 6B, a lower mold 21 of the third and fourth preferred embodiments consists of a lower stationary wall part 21a, a lower mold flat surface part 21b, and a lower mold movable wall part 21c (a lower mold movable side plate). These are basic parts for forming a groove C in the presetter 20 for a flat belt.

Referring to FIG. 6C, a lower mold (with teeth) 31 of the fifth preferred embodiment consists of a lower mold stationary wall part (with teeth) 31a (a lower mold stationary side plate), a lower mold bottom plate (with teeth) 31b, and a lower mold movable wall part (with teeth) 31c. These are basic parts for forming a groove C in the presetter 30 for a toothed belt.

Each of the presetters 26 and 30 is constructed and arranged so as to press from above, after a pair of plate members, namely an upper mold 22 that consists of an upper mold 22a (a keep plate) and an upper mold 22b (a keep plate) are placed on a flat belt 13 or a toothed belt 23.

Disposed between the flat belt 13 or the toothed belt 23 and the upper mold 22 is an intermediate member 14 (at least one selected from a cushion mat, a silicone mat, a mesh mat, and the like). In the presetter 20 for a flat belt, a lower mold movable wall part 21c is fixed to a lower mold flat surface part 21b at predetermined positions by wing screws 27. In the presetter 30 for a toothed belt, a lower mold movable wall part (with teeth) 31c is fixed to a lower mold bottom plate (with teeth) 31b at predetermined positions by the wing screws 27. The lower mold stationary side plate (with teeth) 31a is fixed at its lengthwise both ends to the lower mold (with teeth) 31 by stationary screws 37.

In the end-to-end connection type, as shown in FIGS. 6B and 6C, press working is carried out with a resin sheet 18 interposed between the flat belt 13 of a resin type or the toothed belt 23 and the intermediate member 14. For example, as shown in FIGS. 7A and 7B, the resin sheet 18 is laminated on the connecting portions of the toothed belt 23, and the intermediate member 14 is laminated on the resin sheet 18, and then the upper mold 22a and the upper mold 22b, each constituting the upper mold 22, are laminated on the intermediate member 14.

The presetters 20 and 30 will next be described in detail. As shown in FIG. 6A, the lower mold 21 of the presetter 20 for a flat belt has a lower mold wall part 21a of L-like cross section that is disposed at one end in a lengthwise direction of the lower mold 21, and a lower mold flat surface 21b in its horizontal direction. The connecting portions at the both ends of the flat belt 13 are set linearly on the lower mold flat surface part 21b along the lower mold wall part 21a of the lower mold 21. Adhesive is applied to connecting surfaces at both ends of the flat belt 13, so that the connecting portions at the both ends are temporarily laminated. The lower mold movable wall part 21c opposed to the lower mold wall part 21a is brought into a contact in parallel with the flat belt 13, and then fixed to the lower mold flat surface part 21b by the wing screws 27.

Specifically, slide through slots are formed in the width direction of the lower mold movable wall part 21c, at the positions to be fixed by the wing screws 27 in the lower mold movable wall part 21c. Loosing the fastening by the wing screws 27 allows the lower mold movable wall part 21c to freely slide in the width direction of the presetter 20 (to be adjusted in width).

Here, when the shape of connecting portions is of the laminate connection type, such as a skive (taper) shape or a step shape, the intermediate member 14 such as a cushion mat is set on the flat belt 13, as shown in FIG. 6A. The setting of the intermediate member 14 may be omitted as necessary.

Subsequently, an upper mold 22b is set along the lower mold wall part 21a. Then, the tapered surface of the upper mold 22a is slid to make a width adjustment, so that the upper molds 22a and 22b are set on the intermediate member 14 in the groove C.

When the shape of the connecting portions is of the end-to-end connection type, as in the case with a finger (comb tooth) shape, the resin sheet 18 is set on the flat belt 13, and the intermediate member 14 such as a mesh mat or a cushion mat is set on the resin sheet 18, and then the upper molds 22a and 22b are set on the intermediate member 14, as shown in FIG. 6B.

For the toothed belt 23, the resin sheet 18 is set on the toothed belt 23, and the intermediate member 14 such as a cushion mat is set on the resin sheet 18, and then the upper molds 22a and 22b are set on the intermediate member 14, as shown in FIG. 6C.

The following is a width adjusting method using the upper mold (the keep plate) 22a and the upper mold (the keep plate) 22b that constitute the upper mold 22. FIGS. 8A-1 to 8A-3, and 8B-1 to 8B-3 are schematic diagrams for explaining a method for setting divided upper molds 22 (keep plates), for the purpose of conforming to many types of belt widths (the widths of the groove C).

As shown in the drawings, to cope with many types of belt widths (the widths of the groove C), a rectangular upper mold 22 is divided in its longitudinal direction into two upper molds 22a and 22b in the shape of substantially a trapezoid. As a result, the same angle taper is provided in the upper molds 22a and 22b. Width adjustments can be achieved by allowing the upper mold 22a and the upper mold 22b to slide along their respective tapered portions, while maintaining a contact between these tapered portions. The upper molds 22a and 22b may be shaped as a right angled triangle, instead of the substantially trapezoid.

Figure 8:
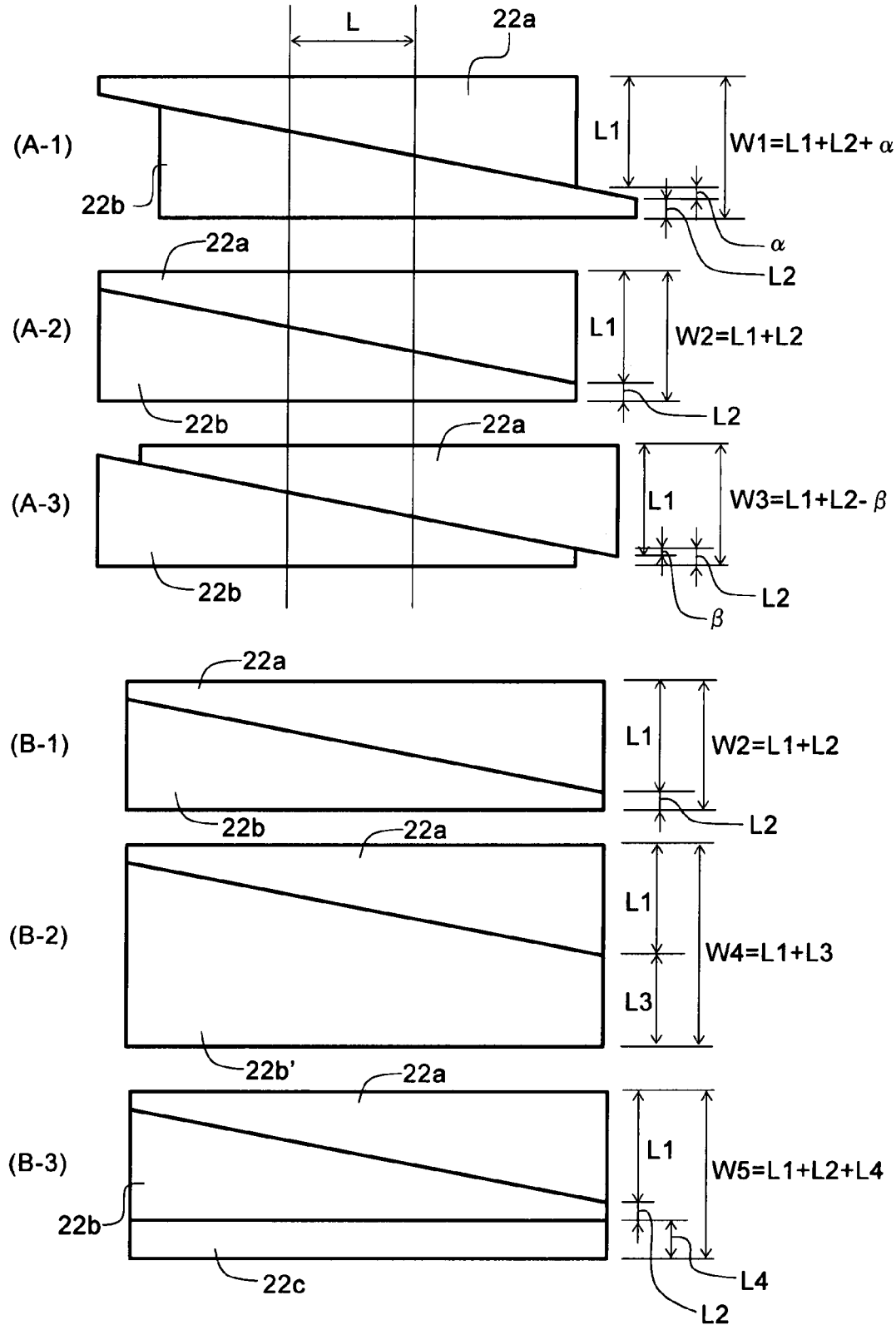

Specifically, as shown in FIGS. 8A-1, a width W of the upper mold 22 is given by the expression: a width $W1=L1+L2+\alpha$, when the upper mold 22a is slid upward with respect to the upper mold 22b, while maintaining a contact between the tapered surfaces (the hypotenuses) of the upper molds 22a and 22b. As shown in FIGS. 8A-2, its width is given by the expression: a standard width $W2=L1+L2$, when the upper mold 22a is not slid. As shown in FIGS. 8A-3, its width is given by the expression: a narrow width $W3=L1+L2-\beta$, when the upper mold 22a is slid downward with respect to the upper mold 22b. This permits width adjustments according to the belt width. In FIGS. 8A-1 to 8A-3, "L" designates the length of a press platen, namely the circumference of the belt connecting portions.

If desired such an adjustment as to further increase the standard belt width (the width of the groove C) in FIGS. 8A-2 and 8B-1, namely the expression: the standard width $W2=L1+L2$, the expression: a wide width $W4=L1+L3$ ($L3 \gg L2$) can be obtained by making no change to the tapered angle, and using an upper mold 22b' whose width is changed from L2 to L3, as shown in FIGS. 8B-2. Alternatively, the expression: a wide width $W5=L1+L2+L4$ can be obtained by adding another rectangular upper mold 22c having a width L4 so as to contact with the upper mold 22a or the upper mold 22b, as shown in FIG. 8B-3.

Figure 9:
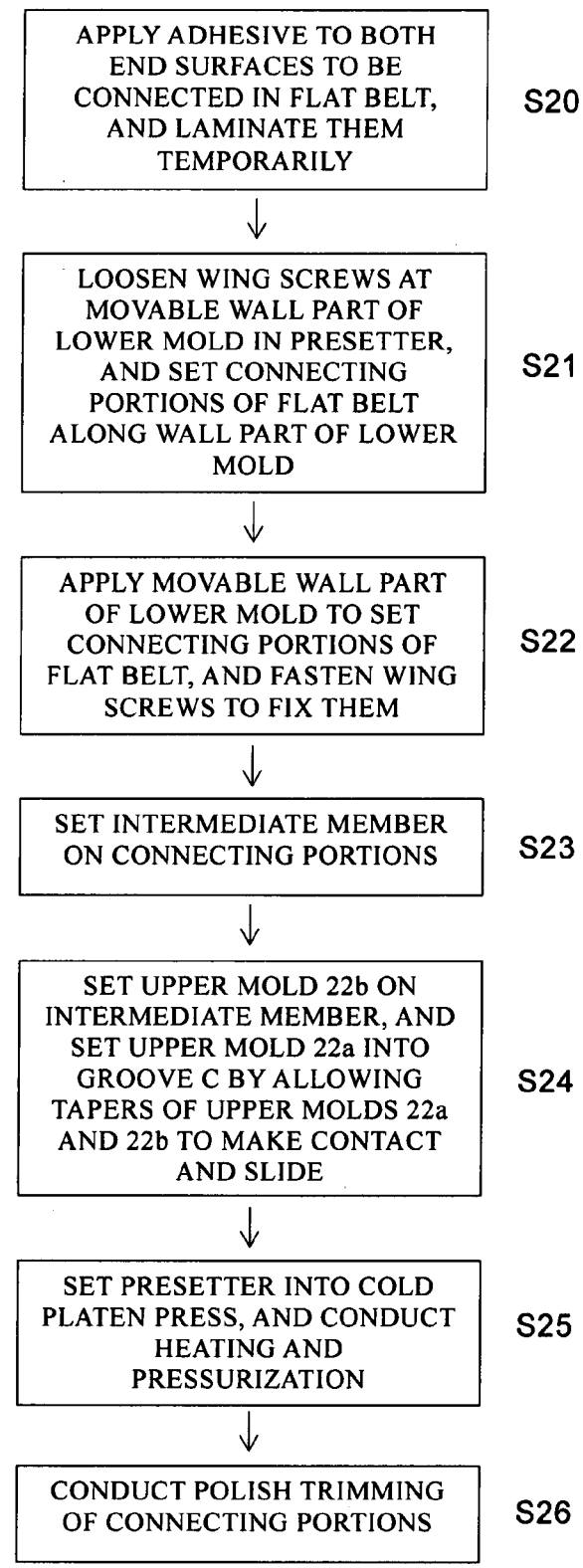
FIG. 9 is a flowchart for explaining a flat belt connecting method according to the third preferred embodiment.

The belt connecting methods for a flat belt or a toothed belt according to the third to fifth preferred embodiments will be described below in detail with reference to the drawings. The flat belt connecting method according to the third preferred embodiment will first described with reference to FIG. 6A and FIG. 9. FIG. 9 is a flowchart for explaining the flat belt connecting method in the third preferred embodiment.

Referring to FIG. 9, adhesive is applied in advance to both connecting end surfaces to be connected in the flat belt 13, the both end surfaces are temporarily laminated (step S20). The shape of the connecting portions may be either one of the skive (taper) shape and the step shape.

The wing screws 27 fixing the lower mold movable wall part 21c of the presetter 20 are loosened to open the groove C, and the connecting portions of the flat belt 13 is set on the lower mold flat surface part 21b along the lower mold wall part 21a of the lower mold 21 (step S21). Alternatively, the temporal lamination in step S20 may be performed together at this stage.

The lower mold movable wall part 21c is slid and set so as to contact in parallel with the connecting portions of the flat belt 13 set in step S21, and the wing screws 27 are then fastened to fix the lower mold movable wall part 21c and the flat belt 13 (step S22).

Subsequently, the intermediate member 14 is set on the connecting portions of the flat belt 13 (step S23). The process of step S23 may be omitted as necessary.

The upper mold 22b is then set on the intermediate member 14 along the lower mold wall part 21a. With the tapered surfaces of the upper molds 22a and 22b engaged with each other, the upper mold 22a is slid (adjusted in width) and set into the groove C (step S24). This results in the state as shown in FIG. 6A.

Next, the presetter 20 with the connecting portions of the flat belt 13 fixed by the steps S21 to S24, is set into a cold platen press, and then subjected to a predetermined temperature and a predetermined pressure for a predetermined time, thereby connecting the connecting portions (step S25). Thereafter, the connecting portions of the flat belt 13 removed from the cold platen press are subjected to polish trimming (step S26). This results in an endless flat belt.

Figure 10:
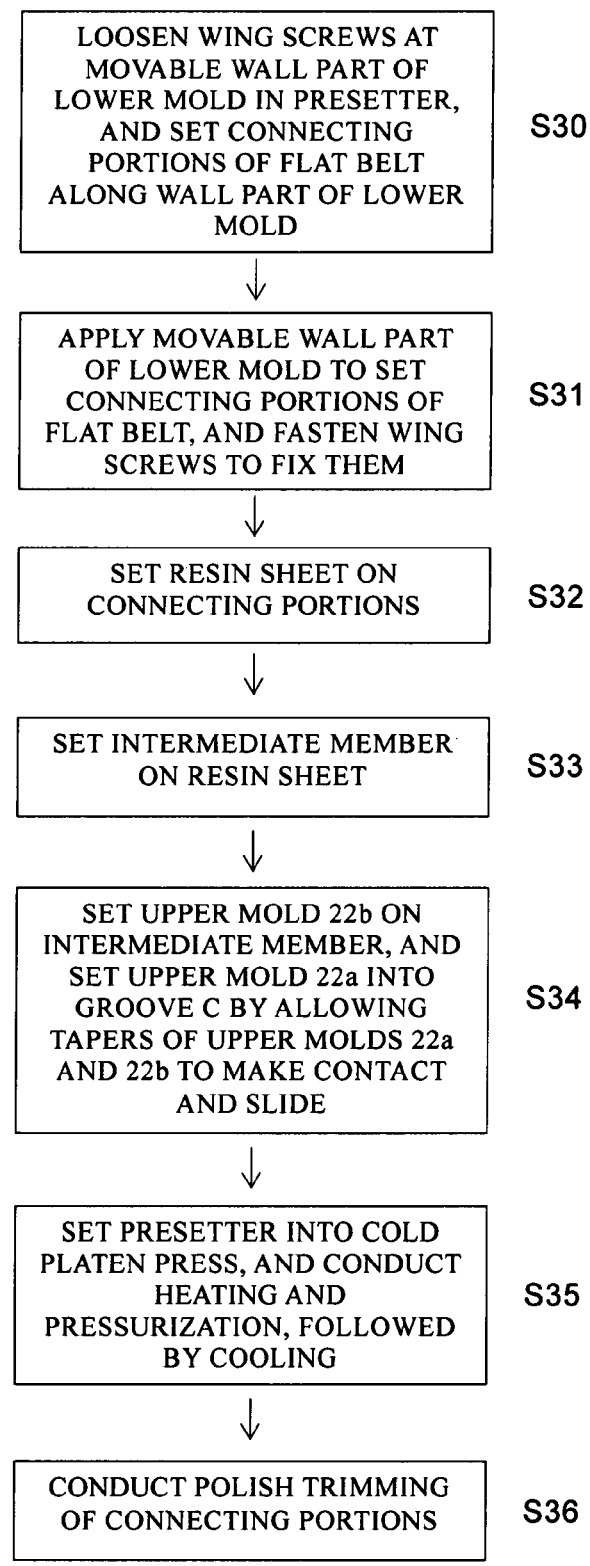
FIG. 10 is a flowchart for explaining a flat belt connecting method according to the fourth preferred embodiment.

The flat belt connecting method according to the fourth preferred embodiment will next be described with reference to FIG. 6B and FIG. 10. FIG. 10 is a flowchart for explaining the flat belt connecting method in the fourth preferred embodiment.

The fourth preferred embodiment differs from the third preferred embodiment in that the resin sheet 18 is further disposed. Specifically, the fourth preferred embodiment is intended for application to a case where the connecting portions of the flat belt 13 are subjected to end-to-end connection, as in the case with the finger shape. That is, both end surfaces to be connected in the flat belt 13 are shaped like a comb tooth, and the resin sheet 18 is set on the connecting portions and surroundings thereof, and an intermediate member 14 such as a mesh mat, a cushion mat, or a silicone mat is set on the resin sheet 18. The upper mold 22b is then set on the intermediate member 14 along the lower mold wall part 21a, and the upper mold 22a is set while it is slid (adjusted in width) with the tapered surfaces engaged with each other.

In the belt connecting method of the fourth preferred embodiment, as shown in FIG. 10, the wing screws 27 fixing the lower mold movable wall part 21c of the presetter 20 are loosened to open the groove C, and the connecting portions of the flat belt 13 are set on the lower mold flat surface part 21b along the lower mold wall part 21a (step S30). The comb tooth shapes of both end surfaces to be connected in the flat belt 13 are positioned and set so as to oppose to and contact with each other, and then fixed temporarily.

Subsequently, the movable wall part 21c is slid and set so as to contact in parallel with the connecting portions of the flat belt 13 set in step S30, and the wing screws 27 are then fastened to fix the lower mold movable wall part 21c and the flat belt 13 (step S31).

The resin sheet 18 is set on the connecting portions and surroundings thereof in the flat belt 13 that are set in steps S30 and S31 (step S32). The rein sheet 18 may be omitted as necessary.

The intermediate member 14 such as a mesh mat, a cushion mat, or a silicone mat is set on the resin sheet 18 set in step S32 (step S33). The upper mold 22b is set along the lower mold wall part 21a, on the intermediate member 14 set in step S13, and the upper mold 22a is set in the same manner as in the third preferred embodiment (step S34). This results in the state as shown in FIG. 6B.

Next, the presetter 10 with the connecting portions of the flat belt 13 fixed by the steps S30 to S34, is set into a cold platen press, and then subjected to a predetermined temperature and a predetermined pressure for a predetermined time, so that the resin sheet 18 is heated and melted to connect the connecting portions. This is then cooled for a predetermined time within the cold platen press (step S35). Thereafter, the side surfaces of the connecting portions of the flat belt 13 removed from the cold platen press are subjected to polish trimming, resulting in an endless flat belt (step S36).

Figure 11:
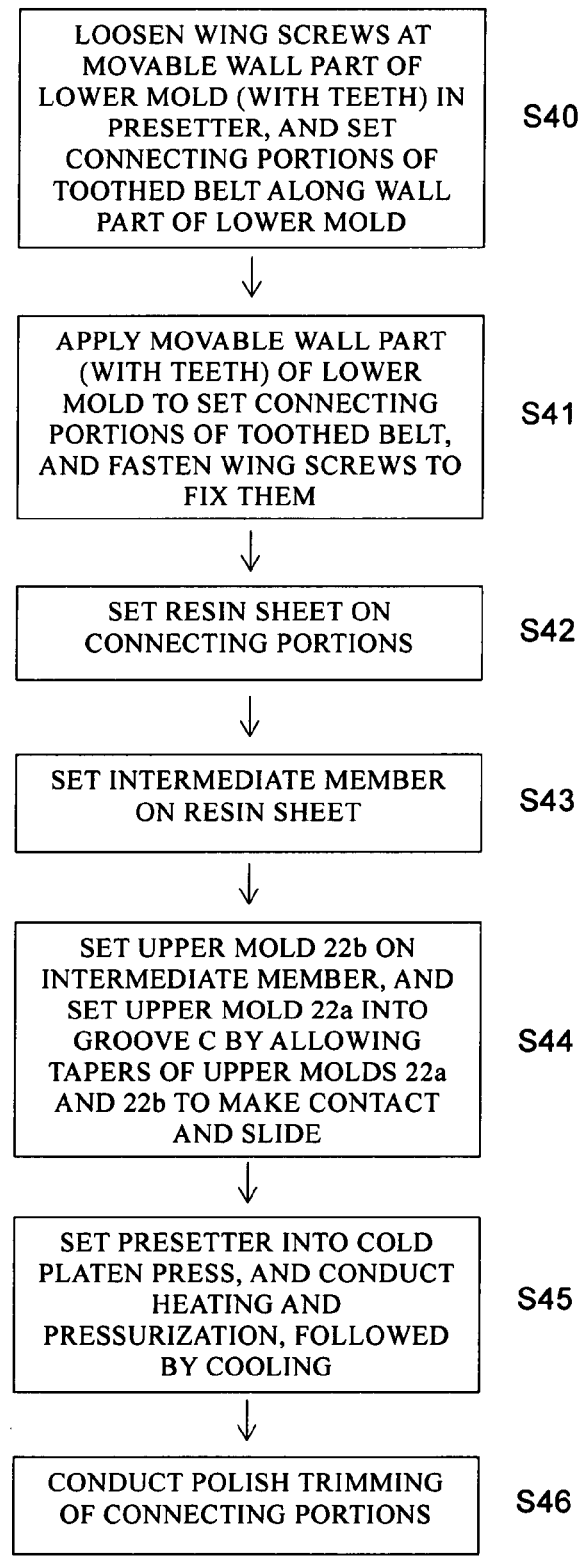
FIG. 11 is a flowchart for explaining a flat belt connecting method according to the fifth preferred embodiment.
Figure 12:
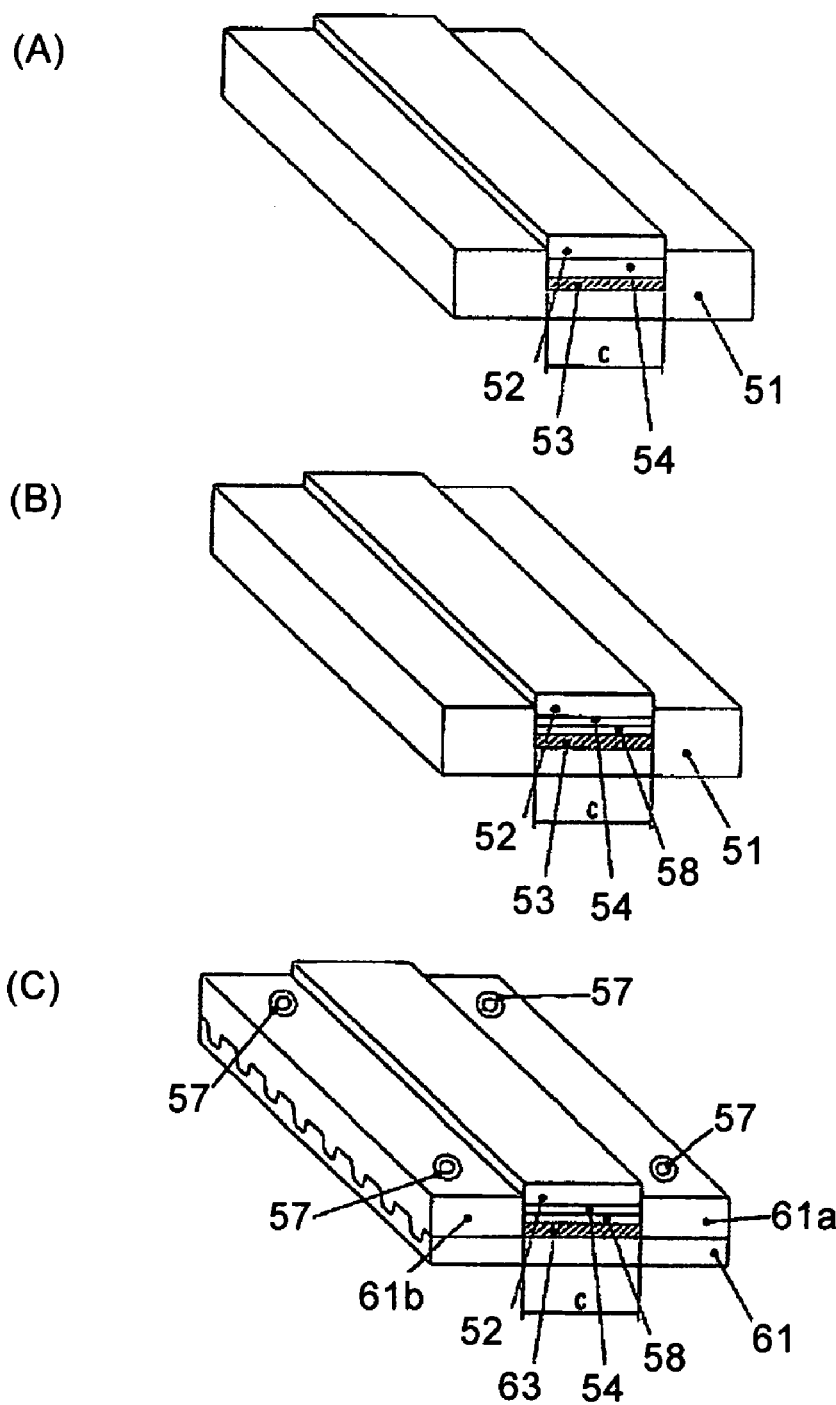
FIGS. 12A to 12C are schematic perspective views illustrating a conventional presetter.

The flat belt connecting method according to the fifth preferred embodiment will next be described with reference to FIG. 6C and FIG. 11. FIG. 11 is a flowchart for explaining the toothed belt connecting method in the fifth preferred embodiment.

The presetter of the fifth preferred embodiment is intended for toothed belts, whereas the presetter of the fourth preferred embodiment is intended for flat belts. Specifically, the fifth preferred embodiment is intended for application to a case where a toothed belt 23 is of a resin type, and its connecting portions to be connected are subjected to end-to-end connection, as in the case with a rectangular finger shape (refer to FIG. 7A). That is, both end surfaces to be connected in the toothed belt 23 are shaped like a rectangular tooth, and a resin sheet 18 is set on the connecting portions and surroundings thereof, and an intermediate member 14 such as a mesh mat, a cushion mat, or a silicone mat is set on the resin sheet 18. Then, the upper mold 22b is set on the intermediate member 14 along a lower mold stationary side plate 31a, and an upper mold 22a is set while it is slid (adjusted in width) with the tapered surfaces engaged with each other.

In the belt connecting method of the fifth preferred embodiment, as shown in FIG. 11, the wing screws 27 fixing the lower mold movable wall part (with tooth) 31c of the presetter 30 are loosened to open the groove C, and the connecting portions of the toothed belt 23 is set on the lower mold flat surface part (with tooth) 31b along the lower mold stationary side plate (with tooth) 31a (step S40). The rectangular shapes of both end surfaces to be connected in the toothed belt 23 are positioned and set so as to oppose to and contact with each other, and then fixed temporarily.

The lower mold movable wall part (with tooth) 31c is slid and set so as to contact in parallel with the connecting portions of the toothed belt 23 set in step S40, and the wing screws 27 are then fastened to fix the lower mold movable wall part 31c and the toothed belt 23 (step S41).

The resin sheet 18 is then set on the connecting portions and surroundings thereof in the toothed belt 23 that are set in steps S40 and S41 (step S42). The intermediate member 14 similar to that described above is set on the resin sheet 18 set in step S42 (step S43).

The upper mold 22b is set along the lower mold stationary side plate 31a, on the intermediate member 14 set in step S43, and the upper mold 22a is set while it is slid (adjusted in width) with the tapered surfaces engaged with each other, in the same manner as in the third preferred embodiment (step S44). This results in the state as shown in FIG. 6C.

Next, the presetter 30 with the connecting portions of the toothed belt 23 fixed by the steps S40 to S44, is set into a cold platen press, and then subjected to a predetermined temperature and a predetermined pressure for a predetermined time, so that the resin sheet 18 is heated and melted to connect the connecting portions. This is then cooled for a predetermined time within the cold platen press (step S45). Thereafter, the side surfaces of the connecting portions in the toothed belt 23 removed from the cold platen press are subjected to polish trimming, resulting in an endless toothed belt (step S46).

Each of the foregoing third to fifth preferred embodiments requires only one presetter 20 or 30, without requiring a large number of the presetter 20 or 30, according to the type of the width of the flat belt 10 or the toothed belt 23. The flat belt 10 and the toothed belt 23, each having different widths, can be processed by width adjustments and magnitude adjustments that can be performed by sliding the upper molds 22a and 22b (22b') of substantially a trapezoid which constitute the upper mold 22. Further, the upper mold 22 can be reliably fixed in the groove C formed by the lower mold stationary wall part and the lower mold movable wall part of the presetter, thereby eliminating defects such as the bend of the connecting portions.

Alternatively, instead of the above-mentioned cold platen press, other press such as a normal platen press may be used. It is to be understood that the present invention is not limited to the foregoing preferred embodiments but is susceptible of various changes and modifications without departing from the spirit and scope of the claimed invention.

What is claimed is:

1. A flat belt connecting method for forming an endless connection of a flat belt by using a presetter, comprising the steps of:
    setting so that the connecting portions at both ends of the flat belt are placed on a lower mold surface of the presetter, and that, with the flat belt held from both sides by a wall part standing from the lower mold surface and a flat belt member having substantially the same compression property as the flat belt, an upper mold of the presetter is placed on the flat belt and the flat belt member, and then fixing the flat belt and the flat belt member by the presetter; and
    connecting the connecting portions at the both ends by pressing the presetter with the flat belt and the flat belt member fixed.

2. The flat belt connecting method according to claim 1 wherein adhesive is applied to connecting surfaces in the connecting portions at the both ends of the flat belt.

3. The flat belt connecting method according to claim 1 wherein the step of fixing the connecting portions at the both ends of the flat belt and the flat belt member is carried out by placing the upper mold of the presetter, via an intermediate member, on the flat belt and the flat belt member.

4. The flat belt connecting method according to claim 3 wherein the intermediate member is a mesh mat or a cushion mat.

5. The flat belt connecting method according to claim 1, further including the step of:
    after connecting the connecting portions at the both ends of the flat belt, releasing the flat belt member from the connecting portions at the both ends.

6. The flat belt connecting method according to claim 1 wherein the flat belt is of a rubber type or a resin type.

7. The flat belt connecting method according to claim 1 wherein the connecting portions at the both ends of the flat belt are subjected to laminate connection or end-to-end connection.

8. The flat belt connecting method according to claim 1 wherein, with the flat belt held from both sides by the wall part and the flat belt member, the flat belt and the flat belt member are firmly fixed by fixing means.

9. The flat belt connecting method according to claim 1 wherein the upper mold of the presetter is placed after placing a resin sheet for melt bonding or the resin sheet and an intermediate member on the connecting portions at the both ends and surroundings thereof in the flat belt.

10. The flat belt connecting method according to claim 1 wherein the press is conducted by a cold platen press.

11. A presetter for use in forming a connection of a flat belt, comprising:
    a lower mold that is used to place connecting portions at both ends of a flat belt and a flat belt member having substantially equivalent compression property as the flat belt;
    a wall part that stands from one side of the lower mold and holds the connecting portions at the both ends of the flat belt from both sides, along with the flat belt member,
    an upper mold placed on the connecting portions at the both ends of the flat belt and the flat belt member; and
    fixing means for firmly fixing the connecting portions at the both ends of the flat belt and the flat belt member.

12. The presetter according to claim 11 wherein the fixing means is provided on each of both sides of the wall part.

13. A belt connecting apparatus that forms an endless connection of a flat belt, comprising:
    a presetter according to claim 11; and
    press means that connects the connecting portions at the both ends by press working, with the flat belt and the flat belt member fixed to the presetter.

14. The belt connecting apparatus according to claim 13 wherein the press means is a cold platen press.

15. A flat belt connecting method for forming an endless connection of a flat belt by using a presetter, comprising the steps of:
    placing connecting portions at both ends of the flat belt on a surface of a lower mold of the presetter;
    holding the flat belt from both sides by a stationary wall part and a movable wall part that stand from the surface of the lower mold;
    fixing the flat belt by placing an upper mold of the presetter whose width is adjusted so as to conform to a width of space in between the stationary wall part and the movable wall part, on an upper surface of the flat belt held between the stationary wall part and the movable wall part; and
    connecting the connecting portions at the both ends by pressing the presetter with the flat belt fixed.

16. The flat belt connecting method according to claim 15 wherein adhesive is applied to connecting surfaces in the connecting portions at the both ends of the flat belt.

17. The flat belt connecting method according to claim 15 wherein the upper mold of the presetter whose width is adjusted is inserted after placing a resin sheet for melt bonding, or the resin sheet and an intermediate member on the connecting portions at the both ends and surroundings thereof in the flat belt.

18. The flat belt connecting method according to claim 15 wherein the connecting portions at the both ends of the flat belt are subjected to laminate connection or end-to-end connection.

19. The flat belt connecting method according to claim 15 wherein the upper mold of the presetter is formed at least by a pair of plate members whose tapered portions are disposed in slidable face-to-face relationship, and the pair of plate members are mutually slid to adjust a width of the upper mold.

20. The flat belt connecting method according to claim 15 wherein, after placing the intermediate member, the upper mold of the presetter whose width is adjusted is engaged in the connecting portions and surroundings thereof in the flat belt.

21. The flat belt connecting method according to claim 15 wherein the press is conducted by a cold platen press.

22. A toothed belt connecting method for forming an endless connection of a toothed belt by using a presetter, comprising the steps of:
    placing connecting portions at both ends of the toothed belt on a surface of a lower mold of the presetter;
    holding the toothed belt from both sides by a stationary wall part and a movable wall part that stand from the surface of the lower mold;
    placing a resin sheet for melt bonding and an intermediate member on the connecting portions at the both ends and surroundings thereof in the toothed belt;
    fixing the toothed belt and the resin sheet and the intermediate member by placing an upper mold of the presetter whose width is adjusted so as to conform to a width of space in between the stationary wall part and the movable wall part, on an upper surface of the intermediate member; and
    connecting the connecting portions at the both ends by pressing the presetter with the toothed belt and the resin sheet and the intermediate member fixed.

23. The toothed belt connecting method according to claim 22 wherein the upper mold of the presetter is formed at least by a pair of plate members whose tapered portions are disposed in slidable face-to-face relationship, and the pair of plate members are mutually slid to adjust a width of the upper mold.

24. A presetter for use in forming a connection of a belt, comprising:
    a lower mold having a flat surface part, a stationary wall part and a movable wall part that stand from the flat surface part and hold from both sides connecting portions at both ends of a belt; and
    an adjustable length upper mold that fixes the flat belt together with the upper mold by inserting at least a bottom surface part into space in between the stationary wall part and the movable wall part.

25. The presetter according to claim 24 wherein the upper mold is formed at least by a pair of plate members whose tapered portions are disposed in slidable face-to-face relationship so that their mutual slides permit adjustment of a width of the upper mold.

26. A belt connecting apparatus that forms an endless connection of a belt, comprising:
    a presetter according to claim 24; and
    press means that connects the connecting portions at the both ends by press working, with the connecting portions of the belt fixed to the presetter.

27. The belt connecting apparatus according to claim 26 wherein the press means is a cold platen press.

* * * * *